Aug. 24, 1954

M. D'AMORE 2,686,934

INJECTION MOLDING APPARATUS

Filed July 7, 1949

INVENTOR

Michael D'Amore

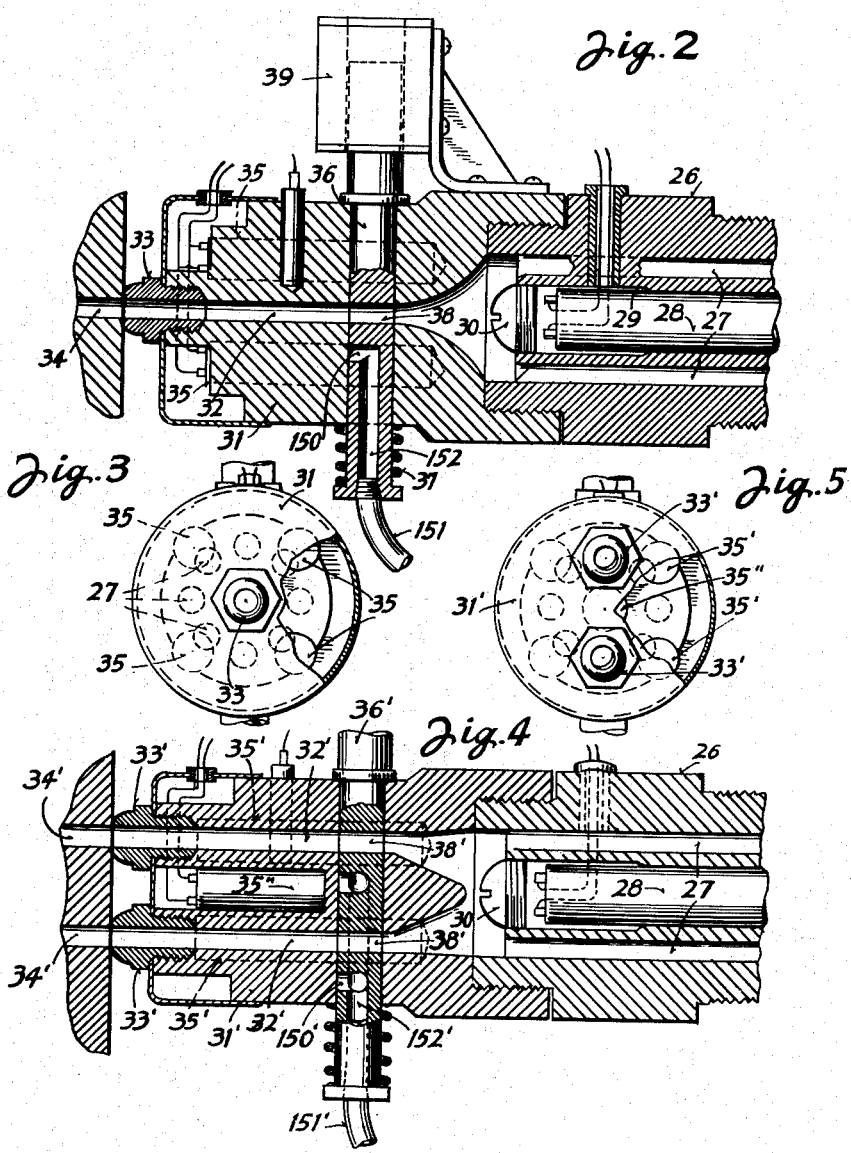

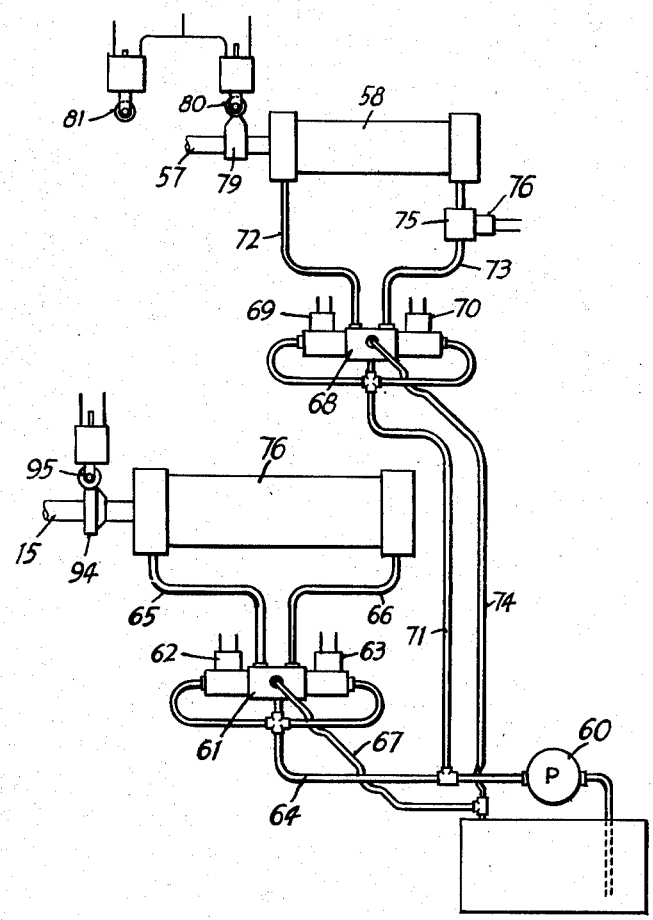

Patented Aug. 24, 1954

2,686,934

UNITED STATES PATENT OFFICE 2,686,934

INJECTION MOLDING APPARATUS

Michael D'Amore, Milwaukee, Wis.

Application July 7, 1949, Serial No. 103,481

2 Claims. (Cl. 18—30)

This invention relates to plastic injectors for use particularly in the injection molding of thermoplastics and the like.

Plastic injectors ordinarily comprise an elongated cylinder having a discharge nozzle at one end and a cooperating plunger operable to force the material through the nozzle into a mold. The material is ordinarily supplied to the cylinder in loose granular or powdered form and is there reduced to a plastic or fluid mass by the application of heat as the material passes to and through the nozzle during an injection stroke of the plunger.

As heretofore designed, the capacity of a plastic injector is seriously limited by the amount of material that can be adequately fluidized or plasticized within the brief period of an injection cycle. This is due largely to the nature of the materials commonly employed. They are liable to serious damage if subjected to temperatures above certain maximums and also they offer very high resistance to the transmission of heat so that heat penetration of the mass is most difficult and time consuming. Yet it is essential to successful injection molding that every particle of material throughout the mass be raised to a fluidizing or plasticizing temperature before it leaves the injection nozzle.

The desirability and capabilities of my meritorious invention can generally be summarized in two words, "capacity" and "time." The capacity of which my device is capable of delivering has never heretofore, according to my best knowledge and belief, been approached by any other plastic injector. Regardless of the fact that the capacity is greatly enlarged, I have found it possible to deliver this greater mass to the mold in a minimum of time, less than the time required by the injectors in delivering far smaller loads. For example, by practising my invention, I have found that a mass weighing approximately fifteen pounds can be injected in a mold in less than six seconds.

One object of the present invention is to provide a thoroughly practical plastic injector of greatly increased capacity.

A further object of the invention is providing an improved plastic injector which is capable of injecting a greater mass by volume in a much reduced period of time.

Another object of the present invention is to provide an improved plastic injector in which the plastics are maintained free of entrained air of other gases.

Other more specific objects and advantages will appear, expressed or implied, from the following description of a plastic injector constructed in accordance with the present invention.

In the accompanying drawings:

Figure 2 is a longitudinal sectional view on a larger scale of the injection nozzle shown in Figure 1.

Figure 3 is an end view of the injection nozzle.

Figure 4 is a longitudinal section view of a multiple injection nozzle that may be substituted for that shown in Figures 1 and 2.

Figure 5 is an end view of the multiple injection nozzle shown in Figure 4.

Figure 6 is a diagram of a hydraulic system employed for energizing the plastic injector shown.

Figure 1:
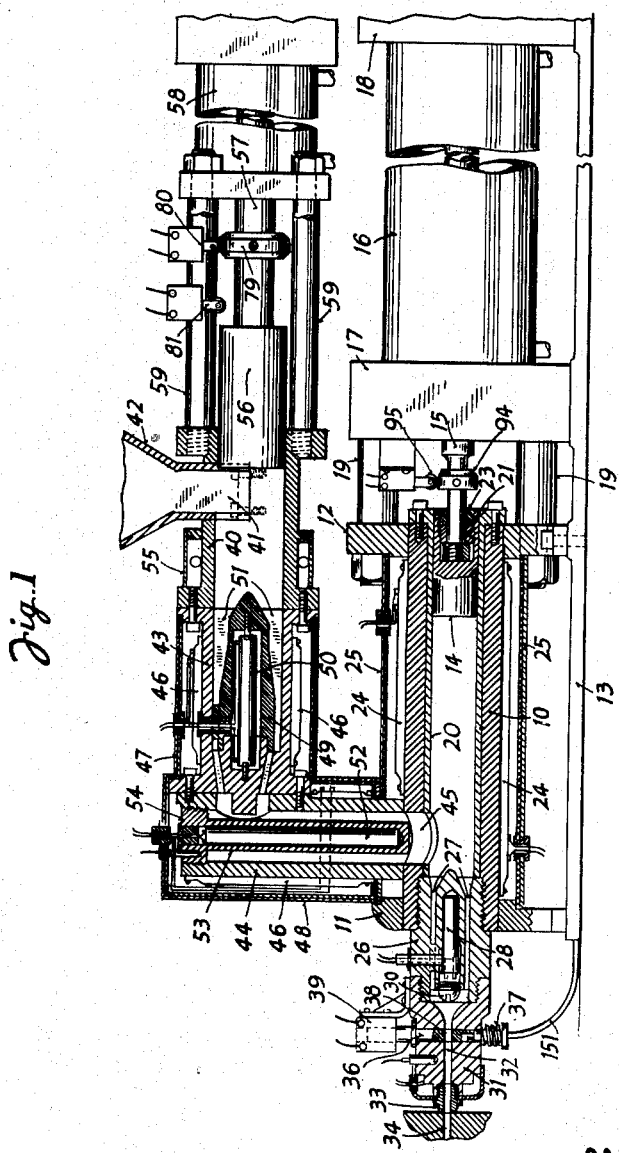
Figure 1 is a vertical longitudinal sectional view of a plastic injector embodying the present invention.

The plastic injector shown comprises an elongated injector cylinder 10 supported in vertical end brackets 11 and 12 anchored to a suitable horizontal bed plate 13. A piston 14 in the cylinder 10 is actuated by the ram 15 of a large hydraulic press cylinder 16 supported by end heads 17 and 18 anchored to the bed plate 13. The injector cylinder 10 and press cylinder 16 are shown rigidly jointed through appropriate tie rods 19.

The injector cylinder 10 is shown provided with a removable tubular liner 20 in which the piston 14 is closely fitted, the liner 20 having a flange 21 at its rear end by which it is bolted or otherwise detachably fixed to the rear end of the cylinder 10.

The piston 14 is preferably flexibly connected to the ram 15 in a manner to compensate for any slight misalignment that may exist between the injection and press cylinders 10 and 16. For this purpose the rear end of the piston 14 is bored to loosely receive a circular head 22 rigidly fixed to the end of the ram 15. Two externally threaded rings 23, loosely encircling the ram 15 and screwed into the piston 14, serve to retain the head 22 against the base of the bore.

The injector cylinder 10 is heated throughout its length by any appropriate means such as a series of electric resister elements 24 of a well known type applied externally thereof and covered by an appropriate heat insulated external shield or jacket 25. The resister elements 24 are preferably thermostatically controlled in a well known manner to automatically maintain the temperature of the cylinder 10 within predetermined limits.

An additional heater in the form of a plug 26 is preferably provided at the forward end of the injector with a circular series of narrow channels 27 extending lengthwise therethrough and communicating with the interior of the cylinder 10. The plug 26 is heated by a thermostatically controlled electric heating element 28 of a well known type disposed within a longitudinal chamber 29 formed centrally of and within the plug and closed by a removable end cap 30.

In the injector shown in Figures 1, 3 and 4 the heater plug 26 provides support for an injection nozzle 31 having a central longitudinal duct 32 that communicates with the interior of the injector cylinder 10 through the several channels 27 in the heater plug. The nozzle 31 is shown provided with a hollow tip 33 through which communication is established between the duct 32 and the receiving channel 34 of a conventional mold. The nozzle 31 is also heated preferably by a series of thermostatically controlled electrical resistors 35 disposed within a circular series of longitudinal bores formed therein.

The duct 32 in the injection nozzle 31 is controlled by an appropriate valve operable to open and close the same. A valve for this purpose may assume various forms but in this instance it comprises a longitudinally reciprocable plunger 36 that extends vertically through the nozzle 31 and the duct 32. A spring 37 reacts on the lower end of the plunger to lower the same into the position shown, in which position a transverse port 38 registers with the duct 32 to permit passage of material therethrough. A solenoid including a coil 39 coacts with the upper end of the plunger 36 to elevate the same into a position where it blocks the duct 32. It will be readily appreciated by one skilled in the art that the plunger 36 may be hydraulically controlled.

Provision is made for supplying material in a hot plastic condition to the injector cylinder 10 preferably through the forward end of the latter. Although mechanism for that purpose may assume various forms, that shown has proven quite satisfactory. This mechanism comprises a horizontal feed cylinder 40 which communicates adjacent its rear end with the discharge throat 41 of an appropriate hopper from which cold material in loose granular or powdered form may be admitted by gravity into the feed cylinder. The feed cylinder 40 is in open communication with the forward end of the injector cylinder 10 through a forward extension 43 of the feed cylinder, through a heavy vertical conduit 44 rigidly attached at its upper end to the extension 43 and at its lower end to the injector cylinder 10, and through a port 45 provided in the injector cylinder adjacent its forward end.

The forward extension 43 of the feed cylinder and the conduit 44 are both externally and internally heated so as to thoroughly heat and plasticize the material passing therethrough. In this instance external heating is effected by the use of thermostatically controlled heating units 46 covered by appropriate shields 47 and 48 in much the same manner as hereinabove described in connection with the injector cylinder 10. The feed cylinder extension 43 is internally heated by a heater plug 49 having a thermostatically controlled electric heating element 50 centrally disposed therein. The plug 49 is detachably fixed in the extension 43 and is provided with a series of radial heating fins 51 extending lengthwise thereof and dividing the annular space between the plug 49 and extension 43 into a series of narrow channels through which the material passes in traveling from the cylinder 40 to the conduit 44. The conduit 44 is internally heated by a thermostatically controlled electrical heating element 52 contained within a tubular housing 53 that extends centrally through the conduit. The housing 53 is supported by an end head 54 screwed into the upper end of the conduit 44 and providing an end closure therefor.

The feed cylinder 40 is preferably equipped with a water jacket 55 or other appropriate means for cooling that portion of the feed cylinder adjacent the hopper 42 so as to thermally isolate the same from the heated forward extension 43 of the feed cylinder and thereby avoid premature heating of the material received through the hopper 42.

A piston 56 closely fitted for reciprocation in the feed cylinder 40 serves a threefold purpose. It serves to initially fill the feed cylinder 40, the extension 43, the conduit 44 and the injector cylinder 10 with material received through the hopper 42 and to refill the feed cylinder before each injection stroke of the injector piston 14. For this purpose the piston 56 is caused to repeatedly reciprocate through a relatively short range beneath the hopper 42 so as to effect a pump-like action by which material intermittently received through the hopper is packed into the cylinder 40 and forced forwardly therethrough. The piston 56 also serves as a back stop to prevent reverse flow of the material from the injector cylinder 10 through the conduit 44, cylinder extension 43 and cylinder 40 during the forward or injection stroke of the piston 14. The piston 56 also serves to maintain the injector cylinder 10 completely filled during the return stroke of the piston 14 by advancing and forcing material into the cylinder 10 as the piston 14 retracts.

The piston 56 is actuated by the ram 57 of a horizontal press cylinder 58 which is rigidly connected to the rear end of the feed cylinder 40 through tie rods 59.

Both press cylinders 16 and 58 are energized hydraulically by liquid received from an appropriate pressure source such as a conventional pump 60.

The cylinder 16 is controlled by a three-position valve 61 of a well known type controlled by two solenoids 62 and 63 as is illustrated in Figure 6. The valve 61 is spring centered so that it normally assumes an intermediate position in which the pressure supply pipe 64 is blocked and the pipes 65 and 66 connected to the opposite ends of the cylinder 16 are both connected to the discharge pipe 67. When one of the solenoids 62 is energized, the valve 61 assumes one extreme position in which it connects the supply pipe 64 with the pipe 65 and the pipe 66 with the discharge pipe 67 to effect retraction of the injector piston 14; and when the other solenoid 63 is energized, the valve 61 assumes an opposite extreme position in which it connects the supply pipe 64 with the pipe 66 and the pipe 65 with the discharge pipe 67 to effect a forward stroke of the injector piston 14.

In a similar manner the press cylinder 58 is controlled by an automatic two-position valve 68 of a well known type controlled by two solenoids 69 and 70. When one of the solenoids 69 is energized the valve 68 assumes one extreme position in which it connects the supply pipe 71 with a pipe 72 leading to the forward end of the cylinder 58 and connects the pipe 73 from the rear end of the cylinder to a discharge pipe 74 to effect retraction of the feed piston 56; and when the other solenoid 70 is energized the valve 68 assumes an opposite extreme position in which the supply pipe 71 is connected to pipe 73 and pipe 72 is connected to discharge pipe 74 to effect a forward stroke of the feed piston 56.

A normally open valve 75 of a well known type controlled by a solenoid 76 is included in the pipe 73. Whenever the solenoid 76 is energized it closes the valve 75 so as to block the flow through pipe 73 and thereby hold the feed piston 56 against retractive movement.

Figure 7:
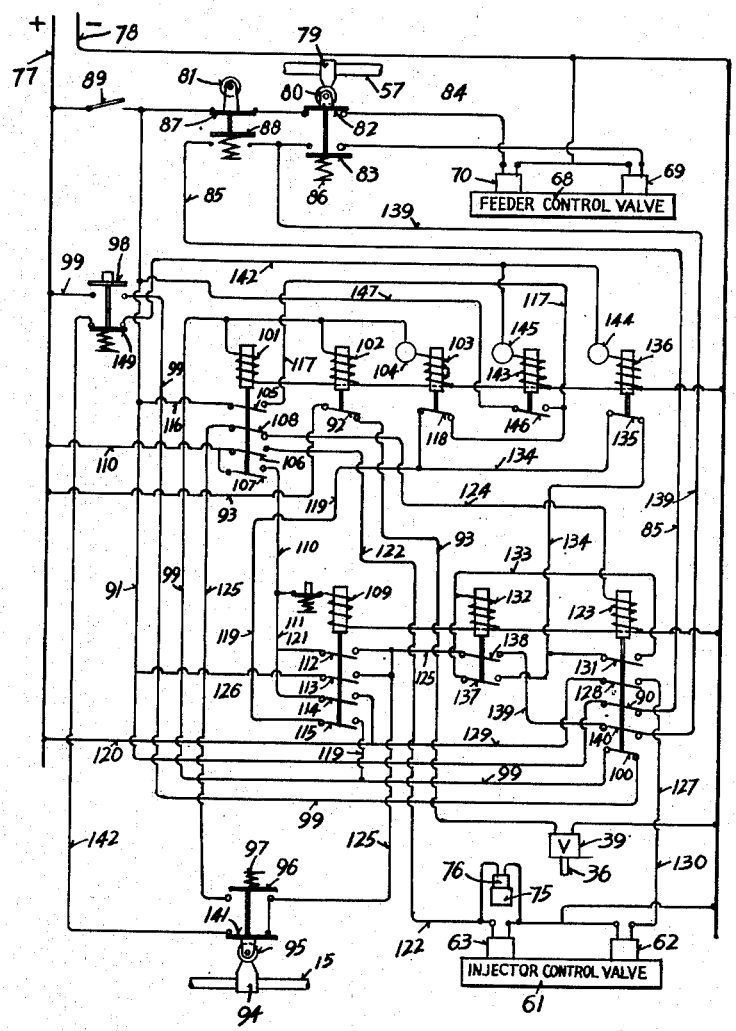
Figure 7 is a diagram of an electrical control system employed.

The several solenoids 62, 63, 69, 70 and 76, as well as the solenoid 39 that controls the nozzle valve 356, are automatically controlled in a manner to effect the desired sequence of operation of the injector piston 14, the feed piston 56, the blocking valve 75 and the nozzle valve 36. An electric control system well adapted for the purpose is diagrammatically illustrated in Figure 7. It is shown energized by the main electrical supply line 77—78.

The feed piston 56 is controlled in its pumping action by a detent 79 carried by the press ram 57 and cooperating with two switch actuating dogs 80 and 81 to normally limit the range of reciprocation of the piston 56. The dogs 80 and 81 are adjustably mounted on one of the tie rods 59 within the path of travel of the detent 79.

The dog 80 controls two integrally connected switches 82 and 83 contained in separate lines 84 and 85, respectively. A spring 86 urges switch 82 toward open position and switch 83 toward closed position, but the detent 79 acts on the dog 80 to close switch 82 and to open switch 83. Similarly the dog 81 controls a normally closed switch 87 in the line 84 and an integrally connected normally open switch 88 in the line 85. The solenoid 70 is controlled by the line 84 which is connectable to the main line 77 through a manually controlled main switch 89. Similarly, the solenoid 69 is controlled by the line 85 which, when the main switch 89 is closed, is normally connected to the main line 77 through a normally closed switch 90 and lead 91.

The arrangement is such that when the switch 89 is closed, the ram 57 and feed piston 56 reciprocate continuously within a range determined by the spacing of the dogs 80 and 81. That is to say, when the piston 56 and ram 57 reach the end of their return stroke, the detent 79 acts on the dog 80 to close the switch 82 and open switch 83, whereupon the solenoid 70 is excited and the valve 68 shifts to effect a forward stroke of the ram 57 and piston 56; thereafter, as the ram 57 advances the switch 83 closes and the switch 82 opens under the action of the spring 86 so that the solenoid 70 is deenergized, and the valve 68 retains its position until the detent 79 strikes the dog 81; thereupon the detent 79 acts on the dog 81 to open the switch 87 and to close the switch 88 to thereby energize the solenoid 69 and cause the valve 68 to shift into position to effect a return stroke of the ram 57 and piston 56. It will of course be understood that during each return stroke of the piston 56 a charge of material enters the feed cylinder 40 through the port 41, and that during each advance stroke of the piston 56 the charge of material thus admitted is advanced forwardly into the cylinder 40. This action continues until all of the spaces within the cylinder 40, conduit 44, and injector cylinder 10 are completely filled and until the piston 56 stalls against the resistance of the material thus packed therein.

Throughout this reciprocating or pumping action of the piston 56 the injector piston 14 remains in the retracted position shown in full lines in Figures 1 and 2, and the nozzle valve 36 is retained in its upper closed position by the solenoid 39 normally energized from the main line 77 through a normally closed switch 92 contained in the lead 93.

The retracted position of the injector piston 14 is determined by a detent 94 adjustably fixed to the ram 15 and cooperating with a switch actuating dog 95 fixed to the end head 17 of the press cylinder 16. A switch 96, normally closed by a spring 97, is opened by the action of the detent 94 upon the dog 95 to terminate the return stroke of the injector piston 14 in a manner to be later described.

After the feed piston 56 has stalled against the material in the cylinder 40, a forward injection stroke of the injector piston 14 is initiated by the momentary closing of a manually controlled normally open switch 98 contained in a line 99 extending from the main line 77 and leading through a normally closed switch 100 to the solenoid coils 101, 102, and 103 of three separate relays. Upon closing the switch 98, two of the coils 101 and 102 are instantly energized but, for reasons that will hereinafter appear, the third coil 103 is not energized until a predetermined period thereafter, an automatic timing device 104 being included in the circuit to effect the desired delayed action of the coil 103.

When energized, the coil 101 closes three normally open switches 105, 106 and 107 and opens switch 108. The closing of switch 107 energizes the coil 109 of a fourth relay through a lead 110 from the main line 77 through a normally closed manually operable switch 111. When the relay coil 109 is energized, it functions to close four normally open switches 112, 113, 114 and 115. The switch 105 functions as a holding switch for the relay coils 101, 102 and 103, all being locked in through a lead 116 from the line 91, through switch 105 and a lead 117 to and through a normally closed switch 118 and a lead 119 which contains the switch 115 (then closed by the relay coil 109) and which is connected to the line 99 leading to the relay coils 101, 102 and 103. The relay coil 101 thus remains energized until the switch 118 is opened by the relay coil 103 or until the switch 115 is reopened by deenergization of the relay coil 109. Also the relay coil 109 is locked in through a lead 120, holding switch 114 and lead 121 to the coil 109, so that the relay coil 109 remains energized so long as the normally closed manually operable switch 111 remains closed.

When the switch 106 is closed by the relay coil 101, the solenoid 63 is energized through leads 110 and 122 so that the injector control valve 61 is shifted and the injector piston 14 starts a forward injection stroke. At the same time the switch 92 is simultaneously opened by the simultaneously energized relay coil 102, so that the solenoid 39 is deenergized and the nozzle valve 36 is shifted to open position to permit discharge of material through the injection nozzle 31 under the thrust of the advancing piston 14. It will also be noted that the solenoid 76 is connected in parallel with the solenoid 63 so that when the latter is energized the solenoid 76 is simultaneously energized to close the valve 75 and thus prevent discharge of liquid from the rear end of the press cylinder 58. The feed piston 56 is thereby locked against retraction and thus prevents escape of material through the port 45 from the injector cylinder 10 so that sufficient pressure may be developed in the cylinder 10 to insure rapid discharge through the nozzle 31.

The injection stroke of the piston 14 continues until the mold 34 is completely filled with material supplied through the nozzle 31 until the piston 14 stalls against the back pressure of the material in the filled mold and there it remains for a short dwell determined by the timing device 104. The device 104 is set to delay energization of the relay coil 103 until a predetermined period of time after the relay coil 101 was energized, the time period being somewhat greater than the time required for the piston 14 to complete its injection stroke. At the end of this time period (including the piston dwell) the relay coil 103 functions to open the switch 118 and thereby deenergize the relay coils 101 and 102 by disconnecting leads 116 and 117 from the lead 119.

Deenergization of the relay coil 102 closes the switch 92 so that the solenoid 39 is again energized and the nozzle valve 36 closed.

Deenergization of the relay coil 101 opens the switch 106 to thereby deenergize the solenoid 63 and permit the injection control valve 61 to assume its intermediate position and thus neutralize the press cylinder 16, and also to deenergize the solenoid 76 so that the valve 75 opens and exposes the feed cylinder 58 to the pressure in the pipe 73 to thereby cause the feed piston 56 to continue its advance against the material in the feed cylinder 40. This continued advance of the feed piston 56 forces the material through the cylinder 40 and conduit 44 into the cylinder 10 to maintain the cylinder 10 filled during retraction of the injector piston 14.

Also when the relay coil 101 became deenergized, the switch 108 closed, thereby energizing the coil 123 of a fifth relay through a lead 124, switch 108, lead 125 (containing the then closed switch 96), switch 113 (then closed by relay coil 109), and lead 126 from lead 91. Energization of the relay coil 123 effects energization of the solenoid 62 through a lead 127, switch 128, and leads 129 and 116 from the main line 77, so that the valve 61 then shifts into position to supply pressure to the forward end of the press cylinder 16 and thus effect retraction of the piston 14 by the action of the press cylinder.

Under some conditions of operation it is desirable to effect retraction of the piston 14 solely by the thrust of the material forced into the injector cylinder 10 by the action of the advancing feed piston 56. For this purpose a manually operable switch 130 is included in the lead 127 which, when open, will prevent energization of the solenoid 62 and thus permit the valve 61 to remain in its intermediate position during the advance of the feed piston 56.

It is important at this stage of the cycle that the switch 88 be rendered ineffective to interrupt the advance of the feed piston 56 when the detent 79 on the advancing ram 57 engages the dog 81. This is accomplished by placing the normally closed switch 90 under the control of relay coil 123, so that when the latter is energized, the switch 90 opens and separates the leads 85 and 91, thereby preventing energization of the solenoid 69 when the switch 88 closes. Due to this arrangement the feed piston 56 continues to advance until the injector piston 14 reaches the end of its return stroke.

When the injector piston 14 reaches the end of its return stroke it comes to rest and the feed piston 56 begins a return stroke by reason of the controls now to be described. When the relay coil 123 became energized by deenergization of the relay coil 101, the coil 123 closed a switch 131 which functioned to energize a coil 132 of a sixth relay through a lead 133, switch 131, and a lead 134 connected with the energized lead 119, the lead 134 containing a normally closed switch 135 controlled by the coil 136 of a seventh relay. The relay coil 132 is locked in by a holding switch 137 which when closed connects the leads 134 and 133. A normally open switch 138 closed by energization of the relay coil 132 is operable to connect lead 125 with a lead 139 which is connected through the normally closed switch 83 with the solenoid 69 of the feeder control valve 68. The lead 139 contains a normally closed switch 140 openable by energization of the relay coil 123.

By virtue of the arrangement just described both of the relay coils 123 and 132 remain energized until the lead 125 is broken by the opening of switch 96, which of course occurs when the dog 95 is actuated by the detent 94 on the ram 15 as the injector piston 14 approaches the end of its return stroke. The opening of the switch 96 effects deenergization of the relay coil 123, causing the switch 128 to open and to deenergize the solenoid 62, whereupon the injector control valve 61 assumes its intermediate neutral position and the injector piston 14 comes to rest. Deenergization of the relay coil 123 also causes the switch 140 to close and to thereby energize the solenoid 69 through the lead 126, switch 113, lead 125, switch 138, lead 139, and the then closed switch 83. The solenoid 69 then functions to shift the feeder control valve 68 into a reverse position so as to effect a return stroke of the feed piston 56.

When the switch 96 opens under the action of the detent 94 upon the dog 95, a second switch 141 connected therewith closes and thereby connects lead 125 with a lead 142 leading to the relay coil 136 and also to the coil 143 of an eighth relay. The action of both coils 136 and 143 are delayed by separate timing devices 144 and 145 of a well known type similar to the timing device 104 hereinabove mentioned.

The timing device 144 is set to delay action of the relay coil 136 for a predetermined period of time after the switch 96 opens, the time period being of such length as to permit the detent 79 on the ram 57 to pass the dog 81 during the return stroke of the feed piston 56. At the end of this period the relay coil 136 acts to open the normally closed switch 135 to thereby effect deenergization of the relay coil 132, it being understood that the holding switch 137 is effective to lock in the coil 132 only while the switch 135 is closed. The switch 138 controlled by the coil 132 then opens and renders the lead 139 ineffective on the solenoid 69. Thereafter the feed piston 56 responds to the action of the detent 79 upon the switch actuating dog 80 and 81 and reciprocates back and forth beneath the hopper port 41 to again pump loose material into the cylinder 40 in the manner hereinabove described.

The timing device 145 is set to delay action of the relay coil 143 for a predetermined time period after the switch 96 has been closed by the return stroke of the injector piston 14, the time period being such as to permit the feed piston 56 to complete its pumping action and to again dwell against the back pressure of the material in the filled feed cylinder 40. When the coil 143 acts, it closes a switch 146 and thereby reenergizes the relay coils 101, 102 and 103 by connecting them to the energized lead 91 through lead 147, switch 146, lead 117, switch 118, lead 119, switch 115 (the coil 109 being still locked in), and lead 99. These relay coils are thus automatically reenergized to start a new cycle without requiring another manual closing of the starting switch 98, the new cycle being a repetition of that above described and being automatically renewed each time that the relay coil 143 acts to close the switch 146.

During the beginning of each cycle, when the injector piston 14 starts an injection stroke, the detent 94 on the ram 15 releases the dog 95 and the switch 141 opens, thereby disconnecting the lead 142 from the energized lead 125 and deenergizing both of the relay coils 136 and 143 so that the switch 135 assumes its normally closed position and the switch 146 assumes its normally open position.

Each cycle terminates with the injector piston 14 and its ram 15 in retracted position and with the switch 141 held closed by the detent 94 and coacting dog 95. With the parts thus positioned, the lead 142 to the relay coils 136 and 143 is connectable to the live wire 91 through the switch 113, so that their timing devices 144 and 145 are liable to be prematurely energized by the initial energization of the relay coil 109. It will be remembered that the relay coil 109 is initially energized when the switch 98 is manually closed, so that unless provision were made to prevent it, premature energization of the timing devices 144 and 145 might occur. To avoid this a normally closed switch 149 is included in the lead 142, this switch being connected to the switch 98 so that, whenever the latter is closed to initially start a cycle, the switch 149 automatically opens to break the lead 142 and thus prevent energization of the timing devices 144 and 145 at that time.

It will thus be noted that mechanism has been provided for filling an injector cylinder 10 with hot plastic material while the injector piston 14 is in retracted position, this being effected by the pumping action of a piston 56 reciprocating beneath the outlet 41 of a supply hopper 42 in a manner to force successive charges of material received from the hopper through a feed cylinder 40, extension 43, and conduit 44. As the material advances through the cylinder extension and conduit 44 it is thoroughly heated to a predetermined plasticizing temperature by external heaters 46 and by internal heater plugs 49 and 53 through or against which the material passes in its travel toward the injector cylinder.

It will be further noted that the mechanism described includes means for securely holding the hot plasticized material against back flow from the cylinder 10 as the injector piston 14 advances on an injection stroke, so that this material can escape only through the injection nozzle into the mold 34. This is effected by blocking escape of liquid from the press cylinder 58 in such manner as to lock the feed piston 56 against retraction under the high back pressure of the material within the conduit 44, cylinder extension 43 and cylinder 40.

It will also be further noted that in the mechanism described provision is made for maintaining the injector cylinder 10 completely filled with hot plasticized material during the return stroke of the injector piston 14. This is made possible by the fact that the material enters the cylinder 10 from adjacent the front end thereof and is actually effected by causing a continuous advance of the feed piston 56 while the injector piston 14 is retracting.

In this connection it is pointed out that in the injector shown the injector piston 14 never advances beyond or closes the inlet port 45 of the injector cylinder 10, so that no partial vacuum or empty pocket is formed ahead of the inlet port such as so commonly occurs during the return stroke of the injector plunger in injectors heretofore used. The elimination of such a vacuum or empty pocket is highly advantageous in that it avoids all danger of admitting air to the plastic material, entrained air being a common cause of defective molded products.

It will also be further noted that in the mechanism described provision is made for adjusting the stroke of the injector piston 14 so as to adapt the amount of material injected during each cycle to the capacity or requirement of the particular mold. This is effected by adjustment of the detent or collar 94 upon the injector ram. By adjusting the collar 94 to a position further from the piston 14, for instance, the collar 94 will engage the switch actuating dog 95 at an earlier point in the return stroke of the piston 14 and thus reduce the effective stroke of the piston 14 and correspondingly reduce the amount of material supplied to the injector cylinder 10 during each return stroke of the piston 14. The functional effect of such an operation is unique and should be appreciated. Thereby the injector may emit a mass varying in weight from an ounce to over fifteen pounds.

In spite of the common practice of heating the nozzles of plastic injectors, it not infrequently happens that the material in the nozzle, and particularly in the tip end thereof, becomes chilled and forms a solid slug the removal of which, though difficult, is necessary for successful injection. In the injector shown provision is made for the quick and easy removal of such slugs, the valve 36 being utilized for that purpose. In this instance a port 150 is formed in the side of the plunger 36 in position to register with the discharge end of the nozzle duct 32 when the plunger 36 is elevated to the valve closing position. A hose 151 leading from a suitable source of air pressure communicates with the port 150 through a longitudinal duct 152 formed in the lower end of the plunger 36. The arrangement is such that by lifting the plunger 36 into valve closing position, a blast of high pressure air may be delivered from the hose 151 through the port 150 to force the outer end of the nozzle duct 32 clear of any material contained therein.

The injector hereinabove described is of a capacity several times greater than injectors heretofore used, this greater capacity being made possible by the fact that the material is delivered to the injector cylinder 10 in a hot and thoroughly plasticized condition. Because of this increased capacity, an injection nozzle 31' having a plurality of discharge ducts 32' may be advantageously employed, particularly when the injector is being used at maximum capacity. Such a nozzle, shown in Figures 5 and 6, is otherwise similar to the nozzle 31 hereinabove described and may be used in place of the latter.

The nozzle shown at 31' is provided with two discharge ducts 32' both communicating with the interior of the injector cylinder through channels 27 in the heater plug 26, but each being equipped with a separate discharge nipple 33' through which the plastic material is forced into separate intake channels 34' in the mold. The fact that the material enters the mold through separate channels 34' is highly desirable in that it facilitates prompt distribution of the material throughout the mold cavity, a condition that is quite advantageous particularly when the mold cavity is of large capacity, extended over a large area, or composed of an intricate network of narrow channels and pockets as is so commonly the case.

In this instance both ducts 32' are controlled by a single cut-off valve in the form of a reciprocable plunger 36' extending through both ducts 32' and having two transverse passages 38' each adapted to register with one of the ducts 32' when the plunger 36' is lowered into the position shown. When raised to a position where the passages 38' are out of line with the ducts 32', the plunger then blocks both ducts. The plunger 36' is operated and controlled in the same manner as above described in connection with the cut-off valve 36 of nozzle 31. The plunger 36' is also shown equipped with two air ports 150' connected through a channel 152' with an air pressure hose 151' by which the ducts 32' may be cleared of material lodged therein in the manner as above described.

The nozzle 31' is heated in much the same manner as nozzle 31 by electric heating elements 35' aranged at opposite sides of each duct 32' and by an additional heating element 35' arranged between the ducts 32'.

Various changes may be made in the embodiment of the invention hereinabove specifically described without departing from or sacrificing the advantages of the invention as defined in the appended claims.

I claim:
1. A plastic injector comprising an injector cylinder and nozzle, said nozzle having a discharge passage therein, means for supplying material to said cylinder, means cooperating with said cylinder to force material therefrom through said nozzle, and means for ejecting material from said passage, said last-named means comprising means for directing a fluid pressure medium outwardly through said passage to clear the same.

2. A plastic injector comprising the combination of an injector cylinder, a discharge nozzle connected thereto, a reciprocable plunger operable to force material from said cylinder through said nozzle, means in continuous communication with said cylinder for supplying material to said cylinder to fill the latter during each return stroke of said plunger, means adjustable to regulate the return stroke of said plunger to thereby regulate the amount of material contained in said cylinder before each working stroke of said plunger, means cooperating with said supply means for heating said material to plasticize the same before admission thereof to said cylinder, and means cooperating with said cylinder to force material therefrom through said nozzle, and means for ejecting material from said passage, said last-named means comprising means for directing a fluid pressure medium outwardly through said passage to clear the same.

References Cited in the file of this patent

UNITED STATES PATENTS

| Number | Name | Date |
|---|---|---|
| 2,043,584 | Husted | June 9, 1936 |
| 2,202,140 | Burroughs | May 28, 1940 |
| 2,443,554 | De Mattia | June 15, 1948 |
| 2,465,889 | Lester et al. | Mar. 29, 1949 |
| 2,493,805 | Dinzl | Jan. 10, 1950 |